United States Patent
Jehle et al.

(10) Patent No.: US 10,712,219 B2
(45) Date of Patent: Jul. 14, 2020

(54) PRESSURE SENSOR AND METHOD FOR MONITORING A PRESSURE SENSOR

(71) Applicant: Endress+Hauser GmbH+Co. KG, Maulburg (DE)

(72) Inventors: Max Jehle, Wehr (DE); Davide Parrotto, Weil am Rhein (DE); Thomas Uehlin, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 237 days.

(21) Appl. No.: 15/748,529

(22) PCT Filed: Jun. 22, 2016

(86) PCT No.: PCT/EP2016/064378
§ 371 (c)(1),
(2) Date: Jan. 29, 2018

(87) PCT Pub. No.: WO2017/016757
PCT Pub. Date: Feb. 2, 2017

(65) Prior Publication Data
US 2018/0217017 A1    Aug. 2, 2018

(30) Foreign Application Priority Data
Jul. 29, 2015 (DE) ......................... 10 2015 112 408

(51) Int. Cl.
*G01L 9/00* (2006.01)
(52) U.S. Cl.
CPC ............ *G01L 9/0076* (2013.01); *G01L 9/002* (2013.01); *G01L 9/0007* (2013.01); *G01L 9/0054* (2013.01)
(58) Field of Classification Search
CPC ... G01L 9/0054; G01L 19/146; G01L 19/147; G01L 19/0084; G01L 19/12;
(Continued)

(56) References Cited

U.S. PATENT DOCUMENTS

| 3,714,829 A | 2/1973 | Gilbert |
| 4,315,236 A | 2/1982 | Tominaga et al. |

(Continued)

FOREIGN PATENT DOCUMENTS

| CN | 2089627 U | 11/1991 |
| CN | 201273820 Y | 7/2009 |

(Continued)

OTHER PUBLICATIONS

Search Report for German Patent Application No. 10 2015 112 408.4, German Patent Office, dated Dec. 2, 2015, 5 pp.

(Continued)

*Primary Examiner* — Brandi N Hopkins
(74) *Attorney, Agent, or Firm* — Christopher R. Powers; Endress+Hauser (USA) Holding Inc

(57) ABSTRACT

A pressure sensor for determining a pressure measurement variable includes a housing, a pressure sensor element arranged in the housing, a lighting means arranged in the housing and a control/evaluation unit, the pressure sensor element having a semiconductor material and a measuring membrane, which has at least one integrated resistance element. When the measuring membrane experiences a pressure dependent deflection, the control/evaluation unit ascertains using the integrated resistance element, an electrical signal for determining the pressure measurement variable, wherein the lighting means optically excites the integrated resistance element, and the control/evaluation unit ascertains, based on a change of the electrical signal caused by the optical excitation, whether a malfunction of the pressure sensor is present.

14 Claims, 2 Drawing Sheets

(58) Field of Classification Search
CPC ..... G01L 9/0076; G01L 9/0007; G01L 9/002; G01L 9/007; G01L 9/0072
See application file for complete search history.

(56) References Cited

U.S. PATENT DOCUMENTS

| | | | |
|---|---|---|---|
| 4,621,503 A | | 11/1986 | Woods et al. |
| 4,631,401 A | | 12/1986 | Parkhurst et al. |
| 5,101,664 A | | 4/1992 | Hockaday et al. |
| 2008/0041164 A1 | | 2/2008 | Cottles et al. |
| 2011/0137580 A1* | | 6/2011 | Bartels ............ G01F 1/72 |
| | | | 702/47 |
| 2013/0134992 A1 | | 5/2013 | Zhu et al. |
| 2018/0372571 A1* | | 12/2018 | Jehle ............ G01L 9/0052 |

FOREIGN PATENT DOCUMENTS

| | | |
|---|---|---|
| CN | 101743462 A | 6/2010 |
| CN | 104729545 A | 6/2015 |
| DE | 10144230 A1 | 3/2003 |
| DE | 10200779 A1 | 7/2003 |
| GB | 2039414 A | 8/1980 |
| GB | 2185106 A | 7/1987 |
| JP | 2000234977 A | 8/2000 |

OTHER PUBLICATIONS

Search Report for International Patent Application No. PCT/EP2016/064378, WIPO, dated Sep. 23, 2016, 17 pp.

* cited by examiner

PRESSURE SENSOR AND METHOD FOR MONITORING A PRESSURE SENSOR

CROSS-REFERENCE TO RELATED APPLICATIONS

The present application is related to and claims the priority benefit of German Patent Application No. 10 2015 112 408.4, filed on Jul. 29, 2015 and International Patent Application No. PCT/EP2016/064378 filed on Jun. 22, 2016, the entire contents of which are incorporated herein by reference.

TECHNICAL FIELD

The invention relates to a pressure sensor for determining a pressure measurement variable as well as to a method for monitoring such a pressure sensor.

BACKGROUND

Pressure sensors serve for registering pressures and are used in industrial measurements technology, for example, for fill level measurement or for flow measurement. In such case, various kinds of pressure sensors are used, depending on area of application. Thus, a pressure sensor can be embodied, for example, as an absolute pressure sensor, as a relative pressure sensor or also as a pressure difference sensor. In principle, however, all pressure sensors are equally constructed and comprise typically a housing in which a pressure sensor element is arranged. Semiconductor pressure sensor elements are popular in pressure measuring technology, for example, pressure sensor elements based on silicon. Semiconductor pressure sensor elements include a measuring membrane, which typically has four resistance elements integrated in its edge region. The measuring membrane is supplied on its first side with a first pressure and on its second side with a second pressure, so that the two pressures bring about a deflection of the measuring membrane. The pressure-dependent deflection of the measuring membrane is registered by the integrated resistance elements and evaluated, so that a pressure measurement variable can be output. As a function of whether the pressure sensor is a relative pressure sensor, an absolute pressure sensor or a pressure difference sensor, the measuring membrane is supplied with the appropriate two pressures.

In the case, in which the pressure sensor is embodied as an absolute pressure sensor, one of the two sides of the measuring membrane is exposed to a vacuum and the other side of the measuring membrane is fed a media pressure to be measured. The absolute pressure sensor measures, thus, the absolute pressure, thus the media pressure to be measured relative to vacuum as reference pressure.

In the case, in which the pressure sensor is embodied as a relative pressure sensor, one of the two sides of the measuring membrane is exposed to atmospheric air pressure as a reference pressure and the other side of the measuring membrane is fed a media pressure to be measured. The relative pressure sensor measures, thus, a relative pressure, thus the media pressure to be measured relative to the atmospheric air pressure.

In the case, in which the pressure sensor is embodied as a pressure difference sensor, one of the two sides of the measuring membrane is fed a first media pressure to be measured and the other side of the measuring membrane a second media pressure to be measured. The pressure difference sensor measures, thus, a pressure difference, thus the difference between the two media pressures.

In ordinary measurement operation, there are always disturbances, which can be significant enough to cause such pressure sensors to fail. Along with that, such pressure sensors have the problem that they are subject to drift, for example, from deposits or aging, such that a corrupted pressure measurement variable can be ascertained.

In order to detect such unintended behavior of pressure sensors, it is necessary that they be monitored or checked during measurement operation.

SUMMARY

An object of the invention is to provide a solution for monitoring, or checking, a pressure sensor.

The object is achieved according to the invention by a pressure sensor as well as a method for monitoring a pressure sensor.

As regards the pressure sensor, the object is achieved by a pressure sensor for determining a pressure measurement variable, comprising at least one housing, a pressure sensor element arranged in the housing, a lighting means likewise arranged in the housing, as well as a control/evaluation unit, wherein the pressure sensor element has a semiconductor material and a measuring membrane, wherein a first pressure ($p_1$) is fed to a first side of the measuring membrane (5) and a second pressure ($p_2$) is fed to a second side of the measuring membrane (5), so that the measuring membrane experiences a pressure-dependent deflection, wherein the measuring membrane has at least one integrated resistance element and the control/evaluation unit ascertains with the assistance of the integrated resistance element an electrical signal for determining the pressure measurement variable, wherein the lighting means optically excites the pressure sensor element, especially the at least one integrated resistance element, and the control/evaluation unit ascertains, based on a change of the electrical signal caused by the optical excitation, whether a malfunction of the pressure sensor is present.

According to the invention, the effect referred to as photoconduction is utilized to enable a diagnosis, or monitoring, of a pressure sensor. The terminology, photoconduction, refers to an effect associated with the inner photoelectric effect, in the case of which the electrical conductivity of semiconductor materials increases due to the formation of unbound electron hole pairs in the presence of irradiation. Due to the irradiation of the pressure sensor element, which includes a semiconductor material and a measuring membrane with at least one integrated resistance element, the electrical resistance of the resistance element is changed and, thus, also an electrical signal, for example, a bridge voltage signal. Based on this change, it can be ascertained, with high probability, whether a malfunction of a pressure sensor is present. Typical malfunctions, which are so ascertainable, include, for example, a drift of the resistance elements and/or a break, tear or crack of the measuring membrane.

An advantageous embodiment of the pressure sensor of the invention provides that, in the case, in which a malfunction is present, the pressure sensor outputs a warning signal.

An advantageous embodiment of the pressure sensor of the invention provides that the optical excitation includes a number of individual optical pulses.

An advantageous embodiment of the pressure sensor of the invention provides that the optical excitation of the pressure sensor element, especially of the integrated resistance element, occurs after a defined, e.g. fixed, time span.

An advantageous embodiment of the pressure sensor of the invention provides that the measuring membrane has other integrated resistance elements and a lighting means is provided for each resistance element.

An advantageous embodiment of the pressure sensor of the invention provides that the lighting means is a light-emitting diode.

As regards the method, the object is achieved by a method for monitoring a pressure sensor, wherein the pressure sensor includes a pressure sensor element, which has a semiconductor material and a measuring membrane with at least one integrated resistance element, wherein the method comprises steps as follows:
  optically exciting the at least one integrated resistance element;
  registering a change of an electrical signal caused by the optical excitation;
  ascertaining whether the registered change of the electrical signal means a malfunction of the pressure sensor is present.

An advantageous form of embodiment provides that, for ascertaining whether a registered change of the electrical signal means a malfunction of the pressure sensor is present, the registered change of the electrical signal is compared with an expected value, and, in the case, in which the registered change of the electrical signal lies outside a tolerance range around the expected value, a malfunction of the pressure sensor is recognized.

Another advantageous form of embodiment provides that a number of individual optical pulses are used for optical excitation, and, for registering the change of the electrical signal, a number of individual electrical signal values are registered. Especially, the form of embodiment provides that the change of the electrical signal is ascertained by an average value formation of the registered number of individual electrical signal values.

Another advantageous form of embodiment provides that in the case, in which a malfunction of the pressure sensor is present, a warning signal is output.

Another advantageous form of embodiment provides that the optical excitation is performed in regular intervals during measurement operation.

Another advantageous form of embodiment provides that the change of the electrical signal is registered as a function of time and malfunction of the pressure sensor is recognized based on such registration.

Another advantageous form of embodiment provides that the pressure sensor element has a number of integrated resistance elements and a selective optical excitation of each of the integrated resistance elements is performed, and wherein for each of the integrated resistance elements a change of its electrical signal is registered and it is ascertained, whether, based on the registered changes, a malfunction of the pressure sensor is present.

BRIEF DESCRIPTION OF THE DRAWINGS

The invention will now be explained in greater detail based on the appended drawing, the figures of which show as follows.

DETAILED DESCRIPTION

Figure 1:
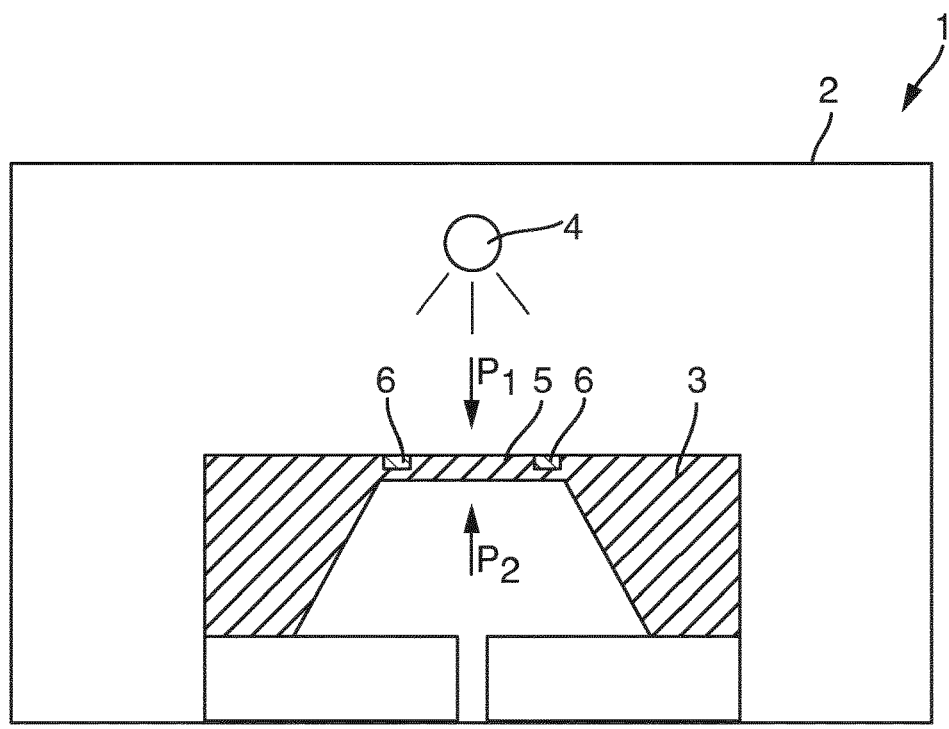
FIG. 1 shows a schematic representation of the pressure sensor of the invention.

FIG. 1 shows a schematic representation of the pressure sensor 1 of the invention. Such includes a housing 2, a pressure sensor element 3 arranged in the housing 2, and a lighting means 4 likewise arranged in the housing.

The pressure sensor element 3 in the housing 2 comprises a semiconductor material, preferably silicon. Introduced into the pressure sensor element 3, for example, by an etching process, is a measuring membrane 5. For determining a pressure measurement variable, for example, when the pressure sensor 1 is embodied as a relative pressure sensor, the measuring membrane 5 is fed on a first side a first pressure $p_1$, for example, an atmospheric pressure, and on a second side a second pressure $p_2$, for example, a media pressure to be measured.

For registering a pressure difference dependent deflection produced by applying the pressures $p_1$ and $p_2$, the measuring membrane includes four resistance elements 6, which are produced, for example, by doping the semiconductor material. The resistance elements 6 integrated in this way into the measuring membrane 5 are typically arranged in the edge region of the measuring membrane 5, in order to register the pressure difference dependent deflection of the measuring membrane 5 in the form of resistance changes. Based on the resistance changes of the resistance elements 6, the pressure sensor 1 can ascertain, and output, a pressure measurement variable.

FIG. 1 shows a relative pressure sensor. The invention is, however, equally applicable to an absolute pressure sensor or a pressure difference sensor.

Figure 2:
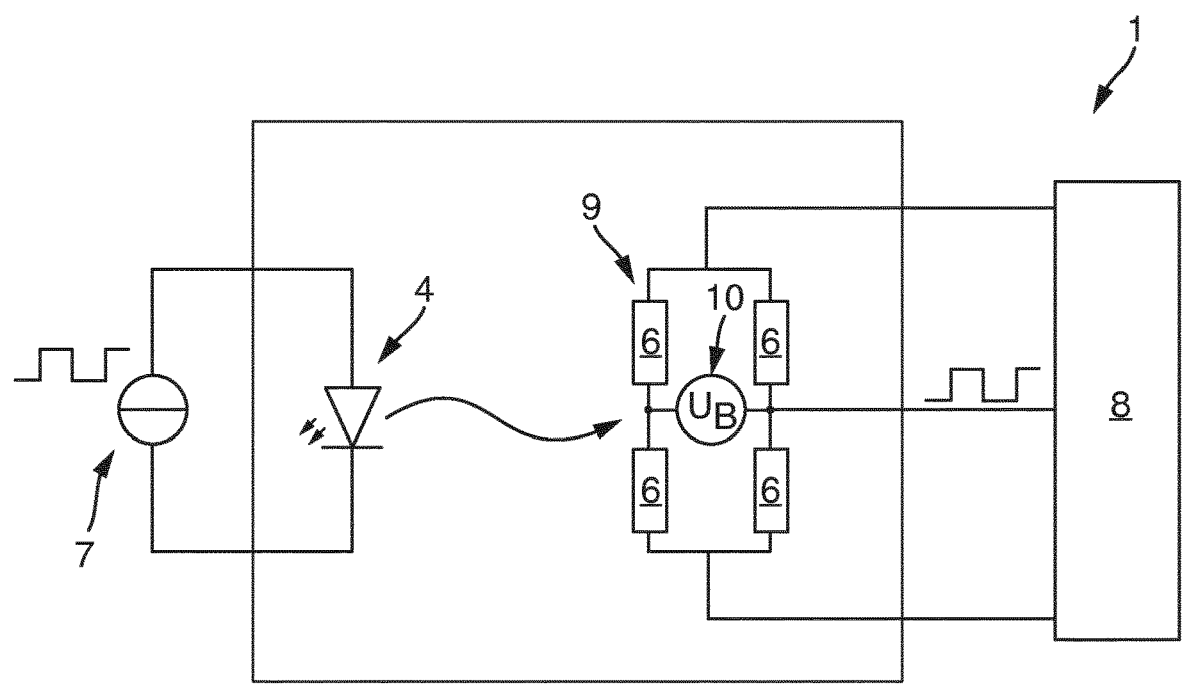
FIG. 2 shows a schematic block diagram of the pressure sensor of the invention.

FIG. 2 shows a schematic block diagram of the pressure sensor 1 of the invention, which includes, besides the lighting means 4 with corresponding control unit 7 for the lighting means and the resistance elements 6, supplementally, a control/evaluation unit 8. The resistance elements 6 are interconnected to form a Wheatstone bridge 9 and the control/evaluation unit 8 serves typically for registering an electrical signal 10, for example, the bridge voltage signal $U_B$, representing the resistance values. Based on the registered electrical signal 10, in the illustrated case the bridge voltage $U_B$, the control/evaluation unit 8 ascertains a pressure measurement variable.

Figure 3:
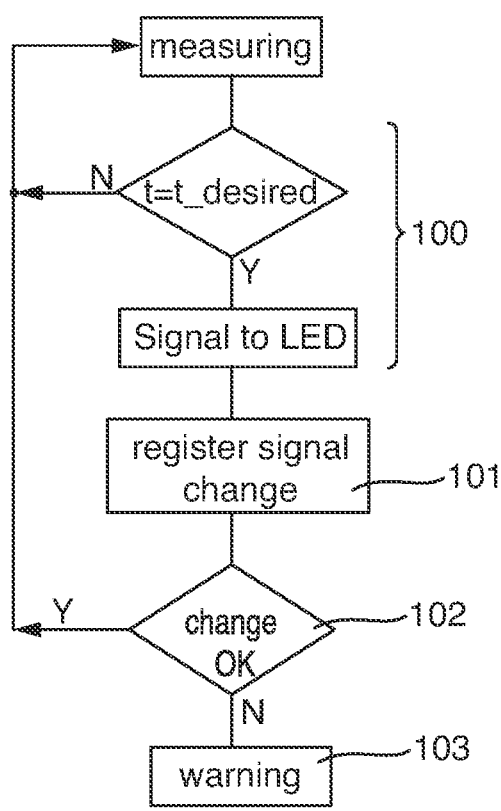
FIG. 3 shows a schematic representation of the method of the invention.

Additionally, the control/evaluation unit 8 is designed to execute the method of the invention schematically shown in FIG. 3 and described below, according to method steps as follows:
  optically exciting the integrated resistance elements 100 by at least one lighting means, which is, for example, a light-emitting diode. The optical excitation can, in such case, occur from a single lighting means or selectively via a number of lighting means, preferably a lighting means for each resistance element. Advantageously, the lighting means is pulsed, i.e. the optical excitations occur from a plurality of individual optical pulses, which directly follow one another.
  registering a change of the electrical signal 101 caused by the optical excitation, wherein, in the case, in which there is a lighting means 4 for each resistance element 6 and, thus, a selective optical excitation of the resistance elements 6 occurs, an electrical signal 10 is, preferably, registered from each of the resistance elements 6.

In the case, in which the optical excitation is produced by a number of individual pulses, it is advantageous to determine the change of the electrical signal by forming an average value of the individually registered signal values.

ascertaining whether, due to the registered change of the electrical signal 10, or the registered changes of the various electrical signals, a malfunction of the pressure sensor is present 102. For this, the registered change of the electrical signal is compared with an expected value. In the case, in which the registered change of the electrical signal 10 lies outside a predetermined tolerance range around the expected value, a malfunction of the pressure sensor is recognized. Serving as expected values can be, for example, theoretically ascertained values, which can be derived from the photoelectric effect, especially the above described photoconduction effect. Alternatively, values experimentally determined earlier can serve as expected values.

outputting a warning signal 103, when a malfunction of the pressure sensor is ascertained.

Figure 4:
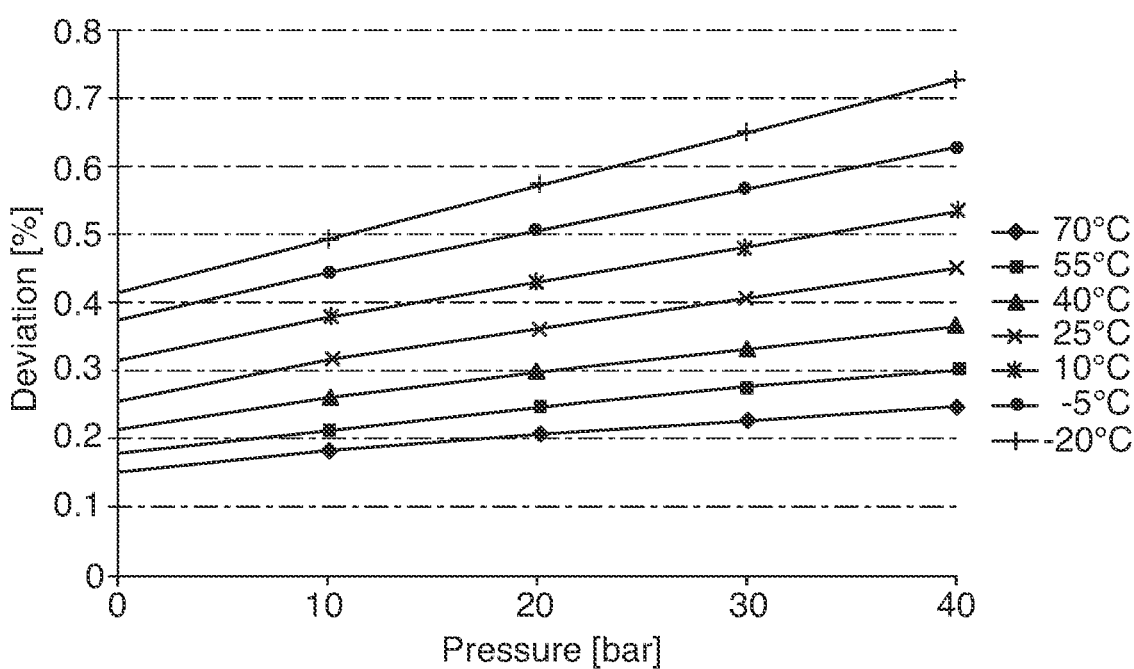
FIG. 4 shows a graph of experimentally ascertained measurements.

FIG. 4 shows an experimentally ascertained measurement graph. In such case, a relative pressure sensor was operated at different pressures (p=0-40 bar) and different temperatures (T=−20° C.-70° C.). The optical excitation occurred from a plurality of individual optical pulses at the corresponding pressures and temperatures. Registered was the change, or deviation, of the electrical signal via an average value formation of the registered number of individuals signal values, wherein the change, or deviation, is the difference between the electrical signal with optical excitation and the electrical signal without optical excitation.

As evident from FIG. 4, the registered electrical signal 10 shows a change as a result of the optical excitation. Likewise evident from FIG. 4 is that a temperature- and pressure dependence of the electrical signal 10 is present, which, in given cases, may still have to be compensated, before a malfunction of the pressure sensor 1 is ascertainable. If, now, in spite of a possible temperature- and pressure compensation, a change of the electrical signal goes beyond the tolerance range, it can with high probability be assumed therefrom that a malfunction, for example, a drift of the resistance elements 6 and/or a membrane fracture, or membrane tear, is present.

The invention claimed is:

1. A pressure sensor for determining a pressure measurement variable, the pressure sensor comprising:
   a housing;
   a pressure sensor element arranged in the housing, the pressure sensor element including a semiconductor material and a measuring membrane, which includes at least one integrated resistance element in contact with the measuring membrane;
   a lighting source arranged in the housing; and
   a control/evaluation unit,
   wherein the measuring membrane is configured such that, when a first pressure is provided to a first side of the measuring membrane and a second pressure is provided to a second side of the measuring membrane, the measuring membrane experiences a pressure-dependent deflection, and the control/evaluation unit ascertains an electrical signal dependent upon the deflection using the at least one integrated resistance element for determining the pressure measurement variable,
   wherein the lighting source is configured to optically excite the pressure sensor element and/or the at least one integrated resistance element, and
   wherein the control/evaluation unit ascertains, based on a change of the electrical signal caused by the optical excitation, whether a malfunction of the pressure sensor is present.

2. The pressure sensor of claim 1, wherein the pressure sensor outputs a warning signal when the malfunction is present.

3. The pressure sensor of claim 1, wherein the lighting source optically excites the pressure sensor element and/or the at least one integrated resistance element using a number of individual optical pulses.

4. The pressure sensor of claim 1, wherein the lighting source optically excites the pressure sensor element and/or the at least one integrated resistance element after a defined time period.

5. The pressure sensor of claim 1, wherein the measuring membrane has more than one integrated resistance element and a lighting source is provided for each integrated resistance element.

6. The pressure sensor of claim 1, wherein the lighting source is a light-emitting diode.

7. A method for monitoring a pressure sensor, the method comprising:
   optically exciting at least one integrated resistance element of a pressure sensor element, the pressure sensor element including a semiconductor material and a measuring membrane, which includes the at least one integrated resistance element in contact with the measuring membrane;
   registering a change of an electrical signal caused by the optical excitation; and
   ascertaining whether the registered change of the electrical signal indicates a malfunction of the pressure sensor is present.

8. The method of claim 7, wherein for ascertaining whether a registered change of the electrical signal indicates a malfunction of the pressure sensor is present, the registered change of the electrical signal is compared with a tolerance range around an expected value, and wherein when the registered change of the electrical signal is outside the tolerance range, a malfunction of the pressure sensor is recognized.

9. The method of claim 7, wherein a number of individual optical pulses are used for the optical excitation, and, for registering the change of the electrical signal, a number of individual electrical signal values are registered.

10. The method of claim 9, wherein the change of the electrical signal is ascertained by an average value formation of the registered number of individual electrical signal values.

11. The method of claim 7, further comprising outputting a warning signal when a malfunction of the pressure sensor is present.

12. The method of claim 7, wherein the optical excitation is performed in regular intervals during measurement operation of the pressure sensor.

13. The method of claim 12, wherein the change of the electrical signal is registered as a function of time and a malfunction of the pressure sensor is recognized based on such registration.

14. The method of claim 7, wherein the pressure sensor element has a plurality of integrated resistance elements, and a selective optical excitation of each of the integrated resistance elements is performed, and wherein for each of the integrated resistance elements a change of its electrical signal is registered, and whether a malfunction of the pressure sensor is present is ascertained based on the registered changes of the electrical signals of each of the integrated resistance elements.

* * * * *